(12) United States Patent
Moir et al.

(10) Patent No.: US 7,577,798 B1
(45) Date of Patent: Aug. 18, 2009

(54) SPACE-ADAPTIVE LOCK-FREE QUEUE USING POINTER-SIZED SINGLE-TARGET SYNCHRONIZATION

(75) Inventors: Mark S. Moir, Hampton, NH (US); Simon Doherty, London (GB); Victor Luchangco, Cambridge, MA (US); Maurice P. Herlihy, Cambridge (GB)

(73) Assignee: Sun Microsystems, Inc., Santa Clara, CA (US)

( * ) Notice: Subject to any disclaimer, the term of this patent is extended or adjusted under 35 U.S.C. 154(b) by 475 days.

(21) Appl. No.: 11/026,255

(22) Filed: Dec. 30, 2004

(51) Int. Cl.
*G06F 12/00* (2006.01)
*G06F 13/00* (2006.01)
*G06F 13/28* (2006.01)

(52) U.S. Cl. ..................... 711/147
(58) Field of Classification Search ............. 711/147
See application file for complete search history.

(56) References Cited

U.S. PATENT DOCUMENTS

| | | | |
|---|---|---|---|
| 4,584,640 A | 4/1986 | MacGregor et al. | |
| 4,847,754 A | 7/1989 | Obermarck et al. | |
| 5,224,215 A | 6/1993 | Disbrow | |
| 5,319,778 A | 6/1994 | Catino | |
| 5,428,761 A | 6/1995 | Herlihy et al. | |
| 5,553,267 A * | 9/1996 | Herlihy ................. | 711/147 |
| 6,128,710 A | 10/2000 | Greenspan et al. | |
| 6,144,965 A | 11/2000 | Olivier | |
| 6,178,423 B1 | 1/2001 | Douceur et al. | |
| 6,360,219 B1 | 3/2002 | Bretl et al. | |
| 6,360,220 B1 | 3/2002 | Forin | |
| 6,366,932 B1 | 4/2002 | Christenson | |
| 6,505,283 B1 * | 1/2003 | Stoney ................. | 711/170 |
| 6,581,063 B1 | 6/2003 | Kirkman | |
| 6,651,146 B1 | 11/2003 | Srinivas et al. | |
| 6,826,757 B2 | 11/2004 | Steele, Jr. et al. | |
| 2001/0047361 A1 | 11/2001 | Martin et al. | |

(Continued)

FOREIGN PATENT DOCUMENTS

EP 0 366 585 5/1990

(Continued)

OTHER PUBLICATIONS

U.S. Appl. No. 09/547,288, filed Apr. 11, 2000 and naming as inventor(s) Shavit et al.

(Continued)

*Primary Examiner*—Sheng-Jen Tsai
(74) *Attorney, Agent, or Firm*—Robert C. Kowert; Meyertons, Hood, Kivlin, Kowert & Goetzel, P.C.

(57) ABSTRACT

Many conventional lock-free data structures exploit techniques that are possible only because state-of-the-art 64-bit processors are still running 32-bit operating systems and applications. As software catches up to hardware, "64-bit-clean" lock-free data structures, which cannot use such techniques, are needed. We present several 64-bit-clean lock-free implementations: including load-linked/store conditional variables of arbitrary size, a FIFO queue, and a freelist. In addition to being portable to 64-bit software (or more generally full-architectural-width pointer operations), our implementations also improve on existing techniques in that they are (or can be) space-adaptive and do not require a priori knowledge of the number of threads that will access them.

54 Claims, 6 Drawing Sheets

U.S. PATENT DOCUMENTS

| | | | | |
|---|---|---|---|---|
| 2003/0140085 | A1* | 7/2003 | Moir et al. | 709/107 |
| 2003/0174572 | A1 | 9/2003 | Moir et al. | |
| 2003/0182462 | A1 | 9/2003 | Moir et al. | |
| 2003/0182465 | A1* | 9/2003 | Moir et al. | 709/314 |
| 2004/0015510 | A1 | 1/2004 | Moir et al. | |
| 2004/0015642 | A1 | 1/2004 | Moir et al. | |
| 2004/0034673 | A1 | 2/2004 | Moir et al. | |
| 2004/0153687 | A1 | 8/2004 | Moir et al. | |

FOREIGN PATENT DOCUMENTS

| | | |
|---|---|---|
| EP | 0 466 339 | 1/1992 |
| WO | WO 86/00434 | 1/1986 |
| WO | WO 01/53942 | 7/2001 |
| WO | WO 01/53943 | 7/2001 |
| WO | WO 01/80015 | 10/2001 |
| WO | WO 01/82057 | 11/2001 |
| WO | WO 03/060705 | 7/2003 |
| WO | WO 03/060715 | 7/2003 |

OTHER PUBLICATIONS

U.S. Appl. No. 09/547,290, filed Apr. 11, 2000 and naming as inventor(s) Shavit et al.

U.S. Appl. No. 09/710,218, filed Nov. 10, 2000 and naming as inventor(s) Harris, Timothy.

U.S. Appl. No. 09/837,671, filed Apr. 18, 2001 and naming as inventor(s) Detlefs et al.

U.S. Appl. No. 10/653,828, filed Sep. 3, 2003 and naming as inventor(s) Martin et al.

U.S. Appl. No. 10/669,948, filed Sep. 24, 2003 and naming as inventor(s) Dice et al.

U.S. Appl. No. 10/670,495, filed Sep. 24, 2003 and naming as inventor(s) Shavit et al.

U.S. Appl. No. 10/894,828, filed Jul. 20, 2004 and naming as inventor(s) Moir et al.

U.S. Appl. No. 10/894,829, filed Jul. 20, 2004 and naming as inventor(s) Moir et al.

U.S. Appl. No. 10/915,502, filed Aug. 10, 2004 and naming as inventor(s) Moir.

U.S. Appl. No. 10/966,465, filed Oct. 15, 2004 and naming as inventor(s) Moir et al.

U.S. Appl. No. 10/995,885, filed Nov. 23, 2004 and naming as inventor(s) Shavit et al.

U.S. Appl. No. 11/008,692, filed Dec. 9, 2004 and naming as inventor(s) Lev et al.

U.S. Appl. No. 11/026,849, filed Dec. 30, 2004 and naming as inventor(s) Moir et al.

U.S. Appl. No. 11/026,850, filed Dec. 30, 2004 and naming as inventor(s) Doherty et al.

Afek, Yehuda, "Wait-Free Made Fast," Proc. 27th Annual ACM Symposium on the Theory of Computing, pp. 538-547, ACM Press, New York, NY 1995.

Anderson, James H. et al., "Using Local-Spin k-Exclusion Algorithms to Improve Wait-Free Object Implementations," *Distributed Computing*, vol. 11, No. 1, pp. 1-20 1997.

Anderson, James H. et al., "Universal Constructions for Large Objects," *IEEE Transactions on Parallel and Distributed Systems*, vol. 10, No. 12, pp. 1317-1332, 1999.

Dice, David et al., "Mostly Lock-Free Malloc," *Proceedings of the 3rd International Symposium on Memory Management*, pp. 163-174, ACM Press, New York, NY, 2002.

Farook, Mohammad et al., "Managing Long Linked Lists Using Lock Free Techniques" In *High Performance Computing Systems and Applications, Chapter 37* (pp. 407-422), Kluwer Academic Publishers, Oct. 1998.

Harris, T., et al., "Language Support for Lightweight Transactions," *Proc. 18th Annual ACM SIGPLAN Conf. on Object-Oriented Programming Systesm, Languages, and Applications*, pp. 388-402, ACM Press, New York, NY, 2003.

Hendler, Danny, et al., "A Scalable Lock-Free Stack Algorithm," *Proceedings of the 16th Annual ACM Symposium on Parallelism in Algorithms and Architectures*, pp. 206-215, ACM Press, New York, NY, 2004.

Herlihy, Maurice, "Dynamic-Sized Lockfree Data Structures," Sun Microsystems Technical Report SMLI TR-2002-112, Jun. 2002.

Herlihy, Maurice et al., "The Repeat Offender Problem: A Mechanism for Supporting Dynamic-Sized Lock-Free Data Structures," Sun Microsystems Technical Report SMLI TR-2002-112, Jun. 2002.

Herlihy, Maurice et al., "Obstruction-Free Synchronization: Double-Ended Queues as an Example," *Proceedings of the 23rd International Conference on Distributed Computing*, p. 522, IEEE Computer Society, Washington, D.C., 2003.

Israeli, Amos et al., "Disjoint-Access-Parallel Implementations of Strong Shared Memory Primitives," *Proc. 13th Annual ACM Symposium on Principles of Distributed Computing*, pp. 151-160, ACM Press, New York, NY, 1994.

Jayanti, P., et al., "Efficient and Practical Contructions of LL/SC Variables," *Proceedings of the 22nd Annual ACM Symposium on the Principles of Distributed Computing*, pp. 285-294, ACM Press, New York, NY, 2003.

Laden-Mozes, E., et al., "An Optimistic Approach to Lock-free FIFO Queues," *Lecture Notes in Computer Science*, vol. 3274, pp. 117-131, Springer-Verlag Berlin Heidelberg 2004.

Martin, Paul et al., "DCAS-Based Concurrent Deques Supporting Bulk Allocation," Sun Microsystems, Inc. Technical Report SMI TR-2002-111, Oct. 2002.

Michael, Maged M. et al., "Non-Blocking Algorithms and Preemption Safe Locking on Multiprogrammed Shared Memory Multiprocessors," *Journal of Parallel and Distributed Computing*, vol. 51, No. 1, pp. 1-26, May 25, 1998.

Michael, Maged M. et al., "Safe Memory Reclamation for Dynamic Lock-Free Objects Using Atomic Reads and Writes," *Proceedings of the 21st Annual ACM Symposium on the Principles of Distributed Computing*, pp. 21-30, ACM Press, New York, NY, 2002.

Michael, M., "Scalable Lock-Free Dynamic Memory Allocation," *Proceedings of the ACM SIGPLAN 2004 Conference on Programming Language Design and Implementation*, pp. 35-46, ACM Press, New York, NY, 2004.

Moir, Mark et al., "Wait-Free Algorithms for Fast, Long-Lived Renaming," *Science of Computer Programming*, vol. 25, No. 1, pp. 1-39, Aug. 1995.

Moir, Mark, "Practical implementation of non-blocking synchronization primitives," *Proceedings of the Sixteenth Annual ACM Symposium on Principles of Distributed Computing*, pp. 219-228, ACM Press, New York, NY, 1997.

Moir, Mark, "Transparent Support for Wait-Free Transactions," *Proceedings of the 11th International Workshop on Distributed Algorithms*, pp. 305-319, Springer-Verlag, London, UK, 1997.

Moir, Mark, "Laziness Pays! Using Lazy Synchronization Mechanisms to Improve Non-Blocking Contructions," *Proc. 19th Annual ACM Symposium on Principles of Distributed Computing*, pp. 61-70, ACM Press, New York, NY, 2000.

Prakash, Sundeep et al., "Non-Blocking Algorithms for Concurrent Data Structures," Technical Report 91-002, University of Florida, Jul. 1, 1991 [URL: http://citeseer.ist.psu.edu/prakash91nonblocking.html].

Prakash, Sundeep et al., "A Nonblocking Algorithm for Shared Queues Using Compare-and-Swap," *IEEE Transactions on Computers*, vol. 43, No. 5, pp. 548-559, May 1994.

Shann, Chien-Hua et al., "A Practical Nonblocking Queue Algorithm Using Compare-and Swap," *Proceedings of the Seventh International Conference on Parallel and Distributed Systems* p. 470, IEEE Computer Society, Washington, D.C., 2000.

Shavit, N., et al., "Elimination Trees and the Construction of Pools and Stacks," *Theory of Computing Systems*, vol. 30, pp. 645-670, 1997. | (as previously seen in SPAA'95: 7th Annual ACM Symposium on Parallel Algorithms and Architectures, Jul. 1995, pp. 54-63, Santa Barbara, California. Also, Tel-Aviv University Technical Report, Jan. 1995).

Shavit, N., et al., "Software Transactional Memory," *Distributed Computing*, vol. 10, No. 2, pp. 99-116, Feb. 1997.

Goetz, Brian, "A First Look at JSR 166: Concurrency Utilities," Mar. 1, 2004. [URL: http://today.java.net/lpt/a/76].

Treiber, R., "Systems Programming: Coping with Parallelism," IBM Technical Report RJ5118, Apr. 23, 1986.

Turek, John et al., "Locking Without Blocking: Making Lock Based Concurrent Data Structure Algorithms Nonblocking," *Proceedings of the Eleventh ACM SIGACT-SIGMOD-SIGART Symposium on Principles of Database Systems*, pp. 212-222, ACM Press, New York, NY, 1992.

Valois, John D., "Lock-Free Linked Lists Using Compare-and-Swap," *Proceedings of the Fourteenth ACM Symposium on Principles of Distributed Computing*, pp. 214-222, ACM Press, New York, NY 1995.

Herlihy, M.P., et al., "Linearizability: A Correctness Condition For Con-Current Objects," *ACM Transactions On Programming Languages and Systems*, 12(3):463-492, Jul. 1990.

Herlihy, M.P., "Wait-Free Synchronization," *ACM Transactions On Programming Languages and Systems*, 11(1):124-149, Jan. 1991.

Massalin, H., et al., "A Lock-Free Multiprocessor OS Kernel," Technical Report TR CUCS-005-9, Columbia University, New York, NY, 1991, 21 pages.

Massalin, Henry, "Synthesis: An Efficient Implementation of Fundamental Operating System Services," Dissertation submitted in partial fulfillment of the requirements for the Degree of Doctor of Philosophy in the Graduate School of Arts and Sciences, Columbia University, New York, NY, online, 158 pages, 1992 [retrieved from the Internet on Jul. 13, 2001: URL:ftp://ftp.cs.columbia.edu/reports/reports-1992/cucs-039-92.ps.gz].

Bershad, B. N., "Practical Considerations For Non-Blocking Concurrent Objects," *Proceedings 13th IEEE International Conference on Distributed Computing Systems*, pp. 264-273. IEEE Computer Society Press, Washington, D.C., 1993.

Herlihy, M., "A Methodology For Implementing Highly Concurrent Data Objects," *ACM Transactions on Programming Languages and Systems*, 15(5):745-770, Nov. 1993.

Attiya, Hagit, et al., "Are Wait-Free Algorithms Fast?" *Journal of the ACM*, 41(4):725-763, Jul. 1994.

Lamarca, A., "A performance evaluation of lock-free synchronization protocols," *Proceedings of the 13th Annual ACM Symposium on Principles of Distributed Computing*, pp. 130-140, ACM Press, New York, NY, 1994.

Michael, Maged M. et al., "Simple, Fast, and Practical Non-Blocking and Blocking Concurrent Queue Algorithms," Proceedings of PODC, pp. 267-275, May 1996.

Attiya, H., et al., "Universal Operations: Unary versus Binary," *Proceedings of the 15th Annual ACM Symposium on Principles of Distributed Computing*, pp. 223-232, ACM Press, New York, NY, 1996.

Greenwald, M. B., et al., "The Synergy Between Non-Blocking Synchronization And Operating System Structure," *Proceedings of the 2nd Symposium on Operating Systems Design and Implementation*, pp. 123-136, Usenix Association, Berkeley, CA, 1996.

Afek, Y., et al., "Disentangling Multi-Object Operations," *Proceedings of the 16th Annual ACM Symposium on Principles of Distributed Computing*, pp. 111-120, Aug. 1997. Santa Barbara, CA.

Arora, N. S., et al., "Thread Scheduling For Multiprogrammed Multiprocessors," *Proceedings of the 10th Annual ACM Symposium on Parallel Algorithms and Architectures*, pp. 119-129, ACM Press, New York, NY, 1998.

Attiya, Hagit, et al., "Atomic Snapshots In O(n log n) Operations," *SIAM Journal on Computing*, 27(2):319-340, Apr. 1998.

Greenwald, M., "Non-Blocking Synchronization and System Design," PhD thesis, Stanford University Technical Report STAN-CS-TR-99-1624, Palo Alto, CA, Aug. 1999, 241 pages.

Agesen, Ole, et al.: "DCAS-Based Concurrent Deques," *SPAA 2000. Proceedings of the 12th Annual ACM Symposium on Parallel Algorithms and Architectures*, pp. 137 146, ACM Press, New York, NY, ISBN: 1-58113-185-2, 2000.

Detlefs, David L., et al., "Even Better DCAS-Based Concurrent Deques," *Lecture Notes in Computer Science*, vol. 1914, pp. 59-73, Springer-Verlag, Berlin, Germany, ISBN: 3-540-41143-7, 2000.

* cited by examiner

US 7,577,798 B1

SPACE-ADAPTIVE LOCK-FREE QUEUE USING POINTER-SIZED SINGLE-TARGET SYNCHRONIZATION

CROSS-REFERENCE TO RELATED APPLICATION(S)

This application is related to commonly-owned U.S. patent application Ser. Nos. 11/026,849, entitled "PRACTICAL IMPLEMENTATION OF ARBITRARY-SIZED LL/SC VARLABLES," and naming Moir, Doherty, Luchangco and Herlihy as inventors and 11/026,850, entitled "A SPACE-ADAPTIVE LOCK-FREE FREELIST USING POINTER-SIZED SINGLE-TARGET SYNCHRONIZATION," and naming Moir, Doherty, Luchangco and Herlihy as inventors, each filed on even date herewith.

BACKGROUND

The present invention relates generally to coordination amongst execution sequences in a multiprocessor, and more particularly, to techniques for coordinating access to shared data and pointer encodings.

For over a decade, 64-bit architectures have been available. These architectures support 64-bit addresses, allowing direct access to huge virtual address spaces. Such architectures typically support atomic access to 64-bit quantities using synchronization primitives such as compare-and-swap (CAS) operations and/or load-linked/store conditional (LL/SC) operation pairs, which provide powerful tools for implementing lock-free data structures.

Operating systems and application software that exploit these 64-bit capabilities have been slower to emerge. Thus, many important 32-bit operating systems and applications are still in common use, and most 64-bit architectures support them. As a result, for several years, techniques that use 64-bit synchronization primitives to atomically manipulate 32-bit pointers together with other information (up to 32 additional bits), such as version numbers, have been widely applicable and many practical lock-free data structures exploit such techniques. Indeed, correctness of many such implementations hinges on the ability to atomically manipulate quantities that are wider than the pointers employed.

The increasing prevalence of 64-bit operating systems and applications (in which pointers are 64 bits) signals the end of this convenient era. As a result, 64-bit-clean lock-free data structures (which do not require synchronization primitives that can atomically manipulate a pointer and a version number) are increasingly important.

SUMMARY

It has been discovered that load-linked, store-conditional (LL/SC) style synchronization may be emulated using techniques that employ only pointer-sized single-target synchronization operations to coordinate access to pointer-referenced LL/SC variables. In some embodiments of the present invention, the software emulation is lock-free, population-oblivious and space-adaptive. To illustrate (and without limitation thereto), we present 64-bit-clean implementations of several important lock-free data structures: arbitrary-size variables supporting LL and sc operations, FIFO queues, and freelists. Some of the illustrated implementations are based on 64-bit compare-and-swap (CAS) operations, but it is straightforward to modify them for use in architectures that support LL/SC instead of CAS.

Our implementations are exploitable even in architectures that provide LL/SC in hardware and, in such exploitations, may eliminate numerous restrictions on the size of variables accessed and the way in which they are used. For example, in some architectures, the programmer must perform only register operations between an LL and the following SC; no such restriction is imposed by our implementation. Our results therefore help programmers to develop portable code, because they can ignore the different restrictions imposed by different architectures on the use of LL/SC. Furthermore, our implementations are portable between 32-bit and 64-bit applications, while many previous lock-free data structure implementations are not.

In some embodiments in accordance with the present invention, an encoding of an end node identifying pointer for a queue includes an associated entry tag selective for a current one of alternate pointers to respective alternative instances of a structure that encodes values corresponding to the end node pointer. In some realizations, we build upon LL and SC emulations. For example, we emulate a load-linked (LL) operation on an end node identifying pointer, in part by using a single-target synchronization operation to ensure consistency of persistent thread local values read for a current one of the alternative pointers and at least a version portion of the associated entry tag. We emulate a store-conditional (SC) operation on the end node identifying pointer, in part by using a single-target synchronization operation to introduce into a non-current one of the alternative pointers a pointer to a structure that encodes a value corresponding to SC operation and thereafter incrementing at least a version portion of the associated entry tag. Space adaptivity can be provided using techniques described herein.

BRIEF DESCRIPTION OF THE DRAWINGS

The use of the same reference symbols in different drawings indicates similar or identical items.

DESCRIPTION OF EMBODIMENT(S)

Versatile mechanisms have been developed for coordinating amongst threads of a multithreaded computation. In particular, techniques have been developed for implementation of lock-free data structures that do not require use of synchronization primitives that operate on quantities larger than pointers employed in the implementation. In some implementations, the techniques are employed to support lock-free data structures accessed using full-architectural-width pointers. Building upon these mechanisms, we present exemplary 64-bit-clean implementations of several important lock-free data structures: arbitrary-size variables supporting LL and SC operations, FIFO queues, and freelists.

For concreteness, we detail implementations that are based on 64-bit CAS; however, as described elsewhere herein, it is straightforward to modify such implementations for use in architectures that support LL/SC instead of CAS. In general, our LL/SC implementation is useful even in architectures that provide LL/SC in hardware because it eliminates numerous restrictions on the size of variables accessed by LL/SC and the way in which they are used. For example, in some architectures, the programmer may perform only register operations between an LL and the following sc; no such restriction is imposed by our implementation. Our results therefore help programmers to develop portable code, because they can ignore the different restrictions imposed by different architectures on the use of LL/SC. Furthermore, our implementations are portable between 32-bit and 64-bit applications, while many previous lock-free data structure implementations are not.

Figure 1:
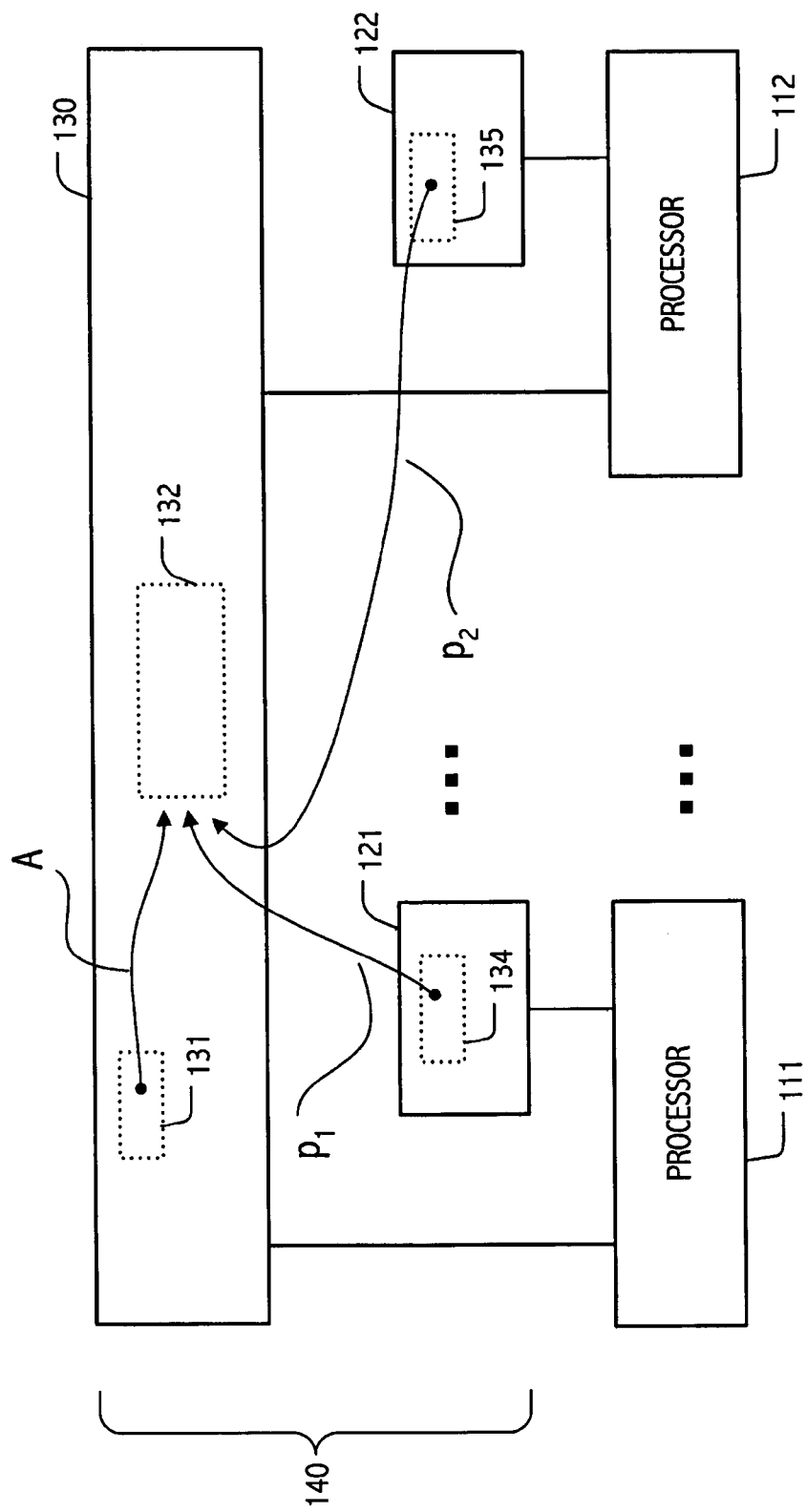
FIG. 1 is a depicts a shared memory multiprocessor configuration that serves as a useful illustrative environment for describing operation of some shared object implementations in accordance with some embodiments of the present invention.

FIG. 1 depicts a shared memory multiprocessor configuration in which techniques of the present invention may be employed. In particular, FIG. 1 depicts a pair of processors 111 and 112 that access storage 140. Storage 140 includes a shared storage portion 130 and local storage portions 121 and 122, respectively accessible by execution threads executing on processors 111 and 112. In general, the multiprocessor configuration is illustrative of a wide variety of physical implementations, including implementations in which the illustrated shared and local storage portions correspond to one or more underlying physical structures (e.g., memory, register, or other computer-readable storage medium), which may be shared, distributed or partially shared and partially distributed.

Accordingly, the illustration of FIG. 1 is meant to exemplify an architectural view of a multiprocessor configuration from the perspective of execution threads, rather than any particular physical implementation. Indeed, in some realizations, data structures encoded in shared storage portion 130 (or portions thereof) and local storage (e.g., portion 121 and/or 122) may reside in or on the same physical structures. Similarly, shared storage portion 130 need not correspond to a single physical structure. Instead, shared storage portion 130 may correspond to a collection of sub-portions each associated with a processor, wherein the multiprocessor configuration provides communication mechanisms (e.g., message passing facilities, bus protocols, etc.) to architecturally present the collection of sub-portions as shared storage. Furthermore, local storage portions 121 and 122 may correspond to one or more underlying physical structures including addressable memory, register, stack or other storage that are architecturally presented as local to a corresponding processor. Persons of ordinary skill in the art will appreciate a wide variety of suitable physical implementations whereby an architectural abstraction of shared memory is provided. Realizations in accordance with the present invention may employ any such suitable physical implementation.

In view of the foregoing and without limitation on the range of underlying physical implementations of the shared memory abstraction, operations on a shared object may be better understood as follows. Memory location 131 contains a pointer A that references an object 132 in shared memory. One or more pointers such as pointer A is (are) employed in a typical multithreaded computation. Local storage 134 encodes a pointer $p_1$ that references object 132 in shared memory. Local storage 135 also encodes a pointer $p_2$ that references object 132 in shared memory. In this regard, FIG. 1 illustrates a state, $*p_1 == *A \&\& *p_2 == *A$, consistent with successful completion of load-type operations that bring a copies of pointer value A into local storage of two threads of a multithreaded computation.

Coordination of any update to contents memory location 131 with computations of threads executing on processors 111 and 112 represents the principal challenge in the implementation of a lock-free data structure that includes object 132. Typically, access to a shared pointer, e.g., pointer A stored in memory location 131, is coordinated using synchronization constructs such as CAS operations or LL and SC operation pairs.

A data structure implementation is linearizable if there is some point—called the linearization point—during the execution of any operation at which the operation appears to have taken place atomically. It is lock-free if it guarantees that after a finite number of steps of any operation on the data structure, some operation completes. It is population-oblivious if it does not depend on the number of threads that will access the data structure. Finally, it is space-adaptive if at all times the space used is proportional to the size of the abstract data structure (and the number of threads currently accessing the data structure).

As conventionally employed, a CAS operation, such as illustrated below, takes the address of a memory location, an expected value, and a new value.

```
bool CAS(a, e, n) {
   atomically {
   if (*a == e) {
      *a = n;
      return true;
   } else
      return false;
   }
}
```

If the location contains the expected value, then the CAS atomically stores the new value into the location and returns true. Otherwise, the contents of the location remain unchanged, and the CAS returns false. We say that the CAS succeeds if it returns true, and that it fails if it returns false.

A typical way to use CAS is to read a value—call it A—from a location, and to then use CAS to attempt to change the location from A to a new value. The intent is often to ensure that the CAS succeeds only if the location's value does not change between the read and the CAS. However, the location might change to a different value B and then back to A again between the read and the CAS, in which case the CAS can succeed. This phenomenon is known as the ABA problem and is a common source of bugs in CAS-based algorithms. The problem can be avoided by storing the variable being accessed together with a version number in a CAS-able word: the version number is incremented with each modification of the variable, eliminating the ABA problem (at least in practice). If the variable being modified is a 64-bit pointer, then this technique cannot be used in architectures that do not support CAS on quantities wider than 64-bits. A significant contribution of our work is a solution to the ABA problem that does not have this shortcoming.

An alternative synchronization construct involves LL and SC operations used in pairs. An SC operation is matched with the preceding LL operation by the same thread to the same variable; there must be such an LL operation for each SC operation, and no LL operation may match more than one SC operation. LL loads the value of a location, and SC conditionally stores a value to a location, succeeding (returning true) if and only if no other stores to the location have occurred since the matching LL. Thus, the ABA problem does not arise when using LL and sc-instead of read and CAS—to modify a variable. Note that the LL/SC semantics described above is the ideal semantics. Hardware LL/SC implementations are usually weaker, and in particular, allow SC to fail even in the absence of an intervening store.

Perhaps more significantly, architectures that provide LL/SC in hardware typically impose numerous restrictions on the size of variables accessed by LL/SC and the way in which they are used. For example, LL/SC variables or arbitrary size are generally unsupported and, in some architectures, the programmer may perform only register operations between an LL and the following SC.

For these and other reasons, researchers have explored LL/SC emulations based on underlying CAS operations. In particular, Anderson and Moir describe a wait-free implementation of a multiword LL/SC that requires $O(mn^2)$ space, where m is the number of variables and n is the number of threads that may access the variables. See J. Anderson and M. Moir, *Universal Constructions for Large Objects*, in *IEEE Transactions on Parallel and Distributed Systems*, 10(12): 1317-1332 (1999). Jayanti and Petrovic present another implementation that uses O(mn) space. P. Jayanti and S. Petrovic, *Efficient and Practical Constructions of LL/SC variables*, in *Proceedings of the 22nd Annual ACM Symposium on the Principles of Distributed Computing* (2003). Unfortunately, due to their scaling behavior, these algorithms can be impractical for applications that require LL/SC on many variables. In addition, they require n to be known in advance. This requirement represents a significant drawback for applications with dynamic threads. Moir presents a lock-free algorithm that uses only O(m) space, but his algorithm is not 64-bit-clean. See M. Moir, *Practical Implementations of Nonblocking Synchronization Primitives in Proceedings of the 15th Annual ACM Symposium on the Principles of Distributed Computing* (1997).

Accordingly, the only previous 64-bit-clean CAS-based implementation of LL/SC is the previously referenced work of Jayanti and Petrovic. However, scaling performance of that implementation is less than ideal and the implementation requires a priori knowledge of a fixed upper bound on the number of threads that will access a given LL/SC variable. We call such implementations population-aware. In contrast, the implementation that we now describe has no such requirement, and is thus population-oblivious, making it particularly useful in computations where a dynamically variable number of threads may cooperate. In addition, the implementation that we now describe uses only O(m+n) space.

LL/SC Emulation for Arbitrary Sized LL/SC Variables

A lock-free implementation of an arbitrary-sized LL/SC variable with the properties we desire is relatively straightforward if we assume unbounded memory and employ a pointer-swinging technique described in more detail below. In general, we store values in nodes and maintain a pointer to the current node. An LL emulation simply reads the pointer to the current node, and returns the contents of the node it points to. An SC emulation allocates a new node, initializes it with the value to be stored, and then uses a single-target synchronization such as CAS to attempt to replace the previously current node with its new one: the SC succeeds if and only if the CAS succeeds. If every SC uses a new node, then the CAS succeeds if and only if there is no change to the pointer between the read in the previous LL and the CAS in an SC.

Our implementation builds on this relatively straightforward idea, but is complicated by the need to free and reuse nodes in order to bound memory consumption. Reclaiming nodes too late results in excessive space overhead. However, reclaiming them too soon leads to other problems. First, an LL that is reading the contents of a node might in fact read part or all of a value stored by an sc that is reusing the node. Second, the CAS might succeed despite changes since the previous read because of the recycling of a node: the ABA problem. We first present the basic implementation, ignoring aspects of the algorithm that are related to node reclamation; these are described later.

For clarity of description, we presume that every LL operation is matched. If a thread decides not to invoke a matching SC operation for a previous LL operation, it instead invokes an unlink operation, which has no semantic effect on the variable. An LL operation is said to be outstanding from its linearization point until the linearization point of its matching SC or unlink operation. For clarity of description, we further presume that a thread will, at given time, have only a single outstanding LL operation. However, based on the description herein persons of ordinary skill in the art will appreciate suitable extensions to allow a thread to have multiple outstanding LLs.

The Basic Implementation

Figure 2A:
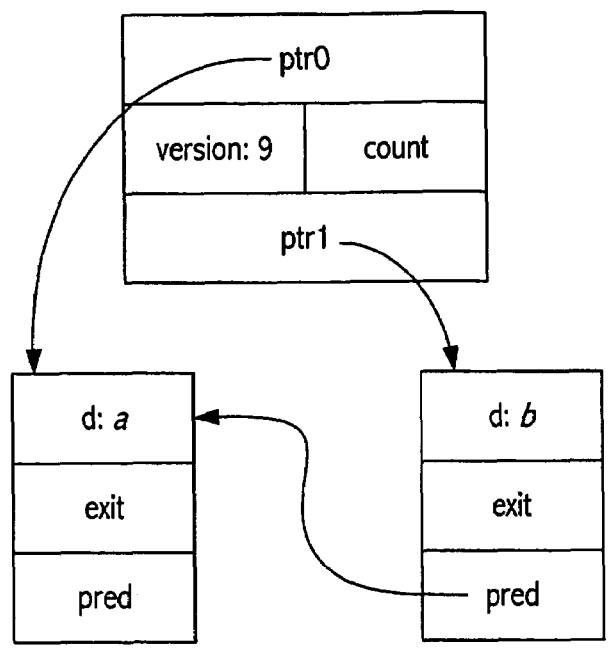
FIGS. 2A and 2B illustrate respective classes of states for data structure maintained in accordance with some embodiments of the present invention.

Rather than storing a pointer to the current node in a single location, we alternate between two locations, only one of which is current at any given instant. FIG. 2A illustrates a structure that includes two fields, ptr0 and ptr1 (211, 212), which encode pointers to respective node encodings.

Data types used in an exemplary LL/SC emulation are detailed below:

```
typedef struct {
    Node *ptr0, *ptr1;
    EntryTag entry;
} LLSCvar;

typedef struct {
    Data d;
    Node *pred;
    ExitTag exit;
} Node;

typedef struct {
    int ver;
    int count;
} EntryTag;

typedef struct {
    int count;
    bool nlC;
    bool nlP;
} ExitTag;
``` where node pointers, ptr0 and ptr1, and EntryTag and ExitTag types may each be updated by operation of a single-target synchronization operation, such as a CAS operation. For example, in a 64-bit clean implementation, node pointers, ptr0 and ptr1, are 64-bit pointers and the node pointers as well as EntryTag elements (including a version field, ver) and ExitTag elements are each updateable by operation of 64-bit CAS operations (or other single target synchronizations). Significance of the ExitTag elements and count field of EntryTag elements (e.g., of EntryTag 213) will be explained later. First, we describe use of the version field (entry.ver).

At any time, one of the node pointers is the current pointer—it points to the current node—and the other is the noncurrent pointer. Which pointer is current is determined by a version number entry.ver: if entry.ver is even, then ptr0 is the current pointer; otherwise ptr1 is. Of course, other current pointer selection conventions may be employed in alternative embodiments. In addition to determining which pointer is current, the version number eliminates the ABA problem in practice, provided the version number has enough bits to ensure that it does not repeat a value during the interval in which some thread executes a short code sequence. In our algorithm, we can easily allocate 32 or more bits to the version number, which we believe is sufficient. In general, selection of an appropriate number of bits may be implementation- or application-specific; however, based on the description herein persons of ordinary skill in the art will appreciate suitable allocations. See generally, M. Moir, *Practical Implementations of Nonblocking Synchronization Primitives*, in *Proceedings of the 15th Annual ACM Symposium on the Principles of Distributed Computing* (1997).

Referring to the exemplary LLSCvar structure described above, emulated operations can be understood as follows. An LL operation determines the current node and returns the data value it contains. An SC operation attempts to change the noncurrent pointer to point to a new node—initialized with the data value to be stored—and then increments entry.ver, making the previously noncurrent pointer current. If the SC operation successfully installs the new pointer but is delayed before incrementing the version number, then another thread can "help" by incrementing the version number on its behalf. The successful SC operation is linearized at the point at which the version number is incremented (either by the thread executing that SC or by a helping thread), causing the newly installed node to become current.

Our mechanism guarantees the following alternating property: In any execution, the sequence of events that modify ptr0 and ptr1 and entry.ver strictly alternates between:

modifying the noncurrent pointer to point to the new node of an SC operation; and incrementing entry.ver, thereby causing the current pointer to become noncurrent and vice versa.

With this property, it is easy to see that the mechanism described above provides the correct semantics:

neither ptr0 nor ptr1 ever changes while it is the current pointer;

the noncurrent pointer is changed exactly once (by an SC operation) between consecutive increments of entry.ver; and each time we increment the version number, and therefore linearize a successful SC (the unique SC that changed the noncurrent pointer since the previous time the version number was incremented), the new node installed by the successful SC operation becomes the current node.

The illustrated LLSCvar structure includes three fields, ptr0, ptr1 and entry, each of which is 64 bits (so the CAS operation can be applied to each field, though not to the entire LLSCvar structure). In addition to the fields already mentioned, the entry field of an LL/SC variable has a count field, and each node has pred and exit fields. The pred field of each node contains a pointer to the node that was current immediately before this node. The other fields are concerned only with node reclamation, and are discussed later.

Initial state for the described LLSCvar structure is as follows:

ptr0->d = $d_0$ ptr0->pred = ptr1 ptr0->exit =<0, false, false> ptr1->exit =<0, true, false> entry.ver =0 entry.count =0 where $d_0$ is the initial value of the location.

Figure 2B:
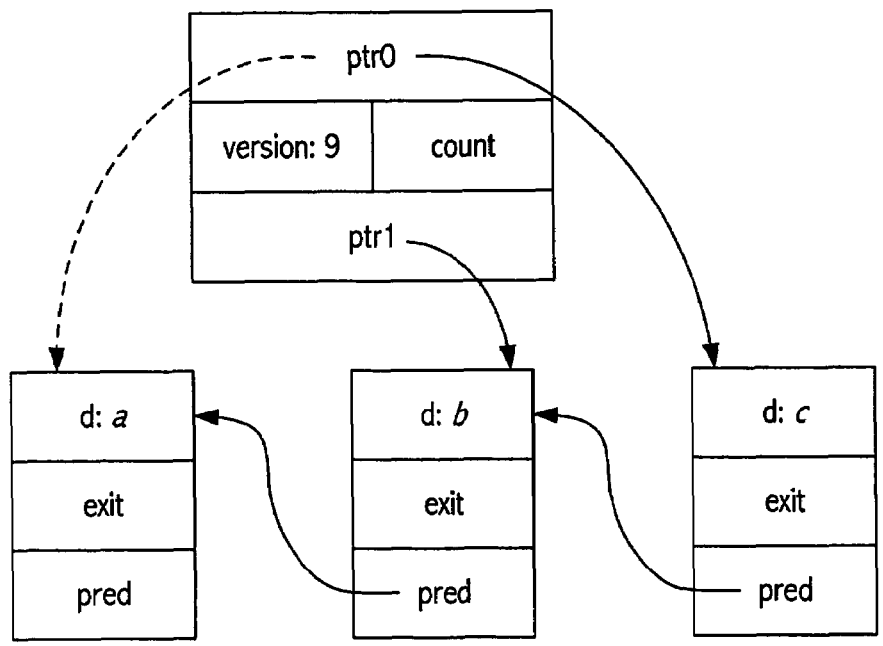

FIGS. 2A and 2B illustrate two classes of states for an LLSCvar structure in accordance with the description above. In both illustrations, entry.ver is odd, so ptr1 is the current pointer and ptr0 is the noncurrent pointer. In FIG. 2A, the noncurrent pointer points to the current node's predecessor (i.e., the node that was current before the node that is current in the figure). In FIG. 2B, the noncurrent3333 pointer points to a new node whose pred field points to the current node. From a state like the one in FIG. 2A, installing a pointer to a new node whose pred field points to the current node into the noncurrent pointer results in a state like the one in FIG. 2B. Furthermore, from a state like the one in FIG. 2B, incrementing entry.ver results in a state like the one in FIG. 2A, because incrementing entry.ver changes its parity, thereby reversing the roles of ptr0 and ptr1. The key to understanding our algorithm is to notice that it alternates between states like that in FIG. 2A and states like that in FIG. 2B. This behavior is captured by the alternating property, which is central to the correctness proof for our algorithm.

We now present our mechanism in greater detail and explain how it preserves the alternating property. For simplicity, we ignore for now details related to node reclamation. Exemplary pseudocode for LL, SC and unlink operations is follows.

```
Macros:
        CURRENT(loc, ver) ≡
           (ver%2 == 0 ? loc->ptr0 : loc->ptr1)
        NONCURADDR(loc, ver) ≡
           (ver%2 == 0 ? &loc->ptr1 : &loc->ptr0)
        INIT_EXIT = <0, false, false>
        Data LL(LLSCvar *loc) {
L1.        do {
L2.           EntryTag e = loc->entry;
L3.           myver = e.ver;
L4.           mynode = CURRENT(loc, e.ver);
L5.        } while (!CAS(&loc>entry, e, <e.ver,e.count+1>));
L6.        return mynode->d;
        }
        void unlink(LLSCvar *loc) {
U1.        while ((e = loc->entry).ver == myver)
U2.           if (CAS(&loc->entry, e, <e.ver,e.count-1>)) return;
U3.        release (mynode);
        }
        bool SC(LLSCvar *loc, Data newd) {
S1.        Node *new_nd = alloc(Node);
S2.        new_nd->d = newd;
           new_nd->pred = mynode;
           new_nd->exit = INIT_EXIT;
S3.        Node *pred_nd = mynode->pred;
S4.        success = CAS(NONCURADDR(loc, myver), pred_nd,
              new_nd);
S5.        if (!success) free(new_nd);
S6.        while ((e = loc->entry).ver == myver)
S7.           if (CAS(&loc->entry, e, <e.ver+1,0>))
S8.              transfer(mynode, e.count);
S9.        release(mynode);
S10.       return success;
        }
```

Each thread has two persistent local variables, mynode and myver, which are set by the LL operation, and retain their values while that LL is outstanding. The CURRENT and NONCURADDR macros determine the current and noncurrent pointers based on the ptr0 or ptr1 fields and the entry.ver fields, as explained above. Specifically, if loc->entry.ver == version, then CURRENT(loc,version) gives the current pointer of loc, and NONCURADDR(loc,version) gives the address of the non-current pointer. The release and transfer procedures, the entry.count field, and the exit field and its initialization value INIT_EXIT are relevant only to node reclamation, as are the effects of unlink. Therefore, we defer further discussion of these procedures and fields until later.

Ignoring for now the effect of the CAS at line L5 on the entry.count field, we see that a thread p executing LL records entry.ver in its persistent local myver variable and the current node indicated by this value in its mynode variable. To ensure a consistent view of the current node and version number, LL retries if entry.ver changes while it determines the current node (lines L2 and L5). The LL operation is linearized at the (unique) point at which p successfully executes the CAS at line L5.

Figure 3:
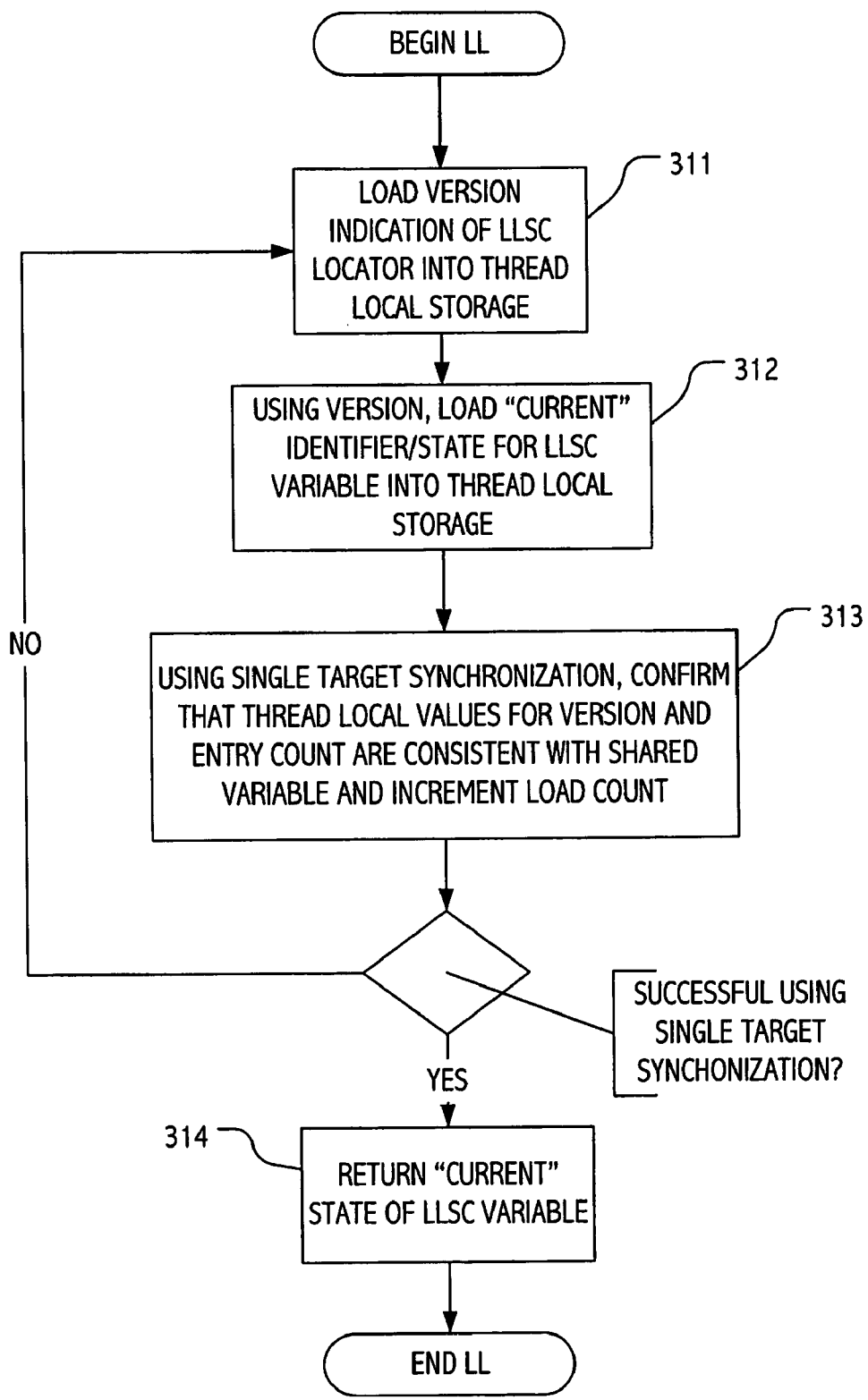
FIG. 3 is a simplified flow diagram for an emulation of a load-linked (LL) operation in accordance with some embodiments of the present invention.

Referring to FIG. 3, some emulations of an LL operation will be understood based on the following simplified description. A version indication of an LL/SC variable locator (such as described above) is loaded (311) from shared storage into thread local storage. Using that version indication, a current identifier (e.g., a pointer to a node containing current state of the LL/SC variable) is loaded (312) from shared storage into thread local storage. Thereafter, using a single-target synchronization (313) such as a compare and swap (CAS), we (i) confirm that thread local values for the version indication and an entry count are consistent with state of the corresponding shared variable and (ii) increment the entry count. If the single-target synchronization is unsuccessful, we reload and retry. Otherwise (if successful), current state of the LL/SC variable is returned (314).

To execute an SC operation in the illustrated implementation, p allocates and initializes a new node with the value to be stored, and stores the node observed as current by the previous LL in the node's pred field (lines S1 and S2). Of course, alternative implementations (including those tailored for use in the context of a particular data structure) may handle allocation and initialization in other ways and/or may forgo the level of indirection provided above to support arbitrary size LL/SC variables. In general, if no suitable lock-free memory allocator is available, then nodes can be allocated from a freelist such as that described in co-pending U.S. patent application Ser. No. 11/026,850, filed on even date herewith, entitled "A SPACE-ADAPTIVE LOCK-FREE FREELIST USING POINTER-SIZED SINGLE-TARGET SYNCHRONIZATION" and naming Moir, Doherty, Luchangco and Herlihy as inventors, the entirety of which is incorporated by reference.

Referring again to the previously-detailed SC operation, following initialization, p uses CAS to attempt to change the noncurrent pointer to point to the new node (line S4). We do not simply read the contents of the noncurrent pointer in order to determine the expected value for this CAS. If we did, two different SC operations could install new nodes in the noncurrent pointer, without the noncurrent pointer becoming current as the result of an increment of entry.ver. Such behavior would violate the alternating property.

To avoid this problem, we instead determine the expected value for the CAS by reading the pred field of the node observed as current (line S3). Recall that when a node becomes current, its pred field points to the node that was current immediately before it. Thus, the pred field of the current node is the same as the noncurrent pointer before a new node is installed. Once an SC has successfully changed the noncurrent pointer to point to a new node, no other SC can do so again before entry.ver is incremented. This could happen only if some thread previously saw the newly installed node as the predecessor of some node. As we explain later, our node reclamation technique precludes this possibility.

After the execution of line S4, either p's SC has succeeded in changing the noncurrent pointer, or some other SC has. In either case, the entry.ver field should now be incremented in order to make the successful SC that installed a new node take effect. The CAS at line S7 ensures that the version number is incremented. The loop at lines S6 through S8 is provided because the CAS at line S7 may fail for reasons other than another thread having incremented entry.ver; this possibility is explained below.

Figure 4:
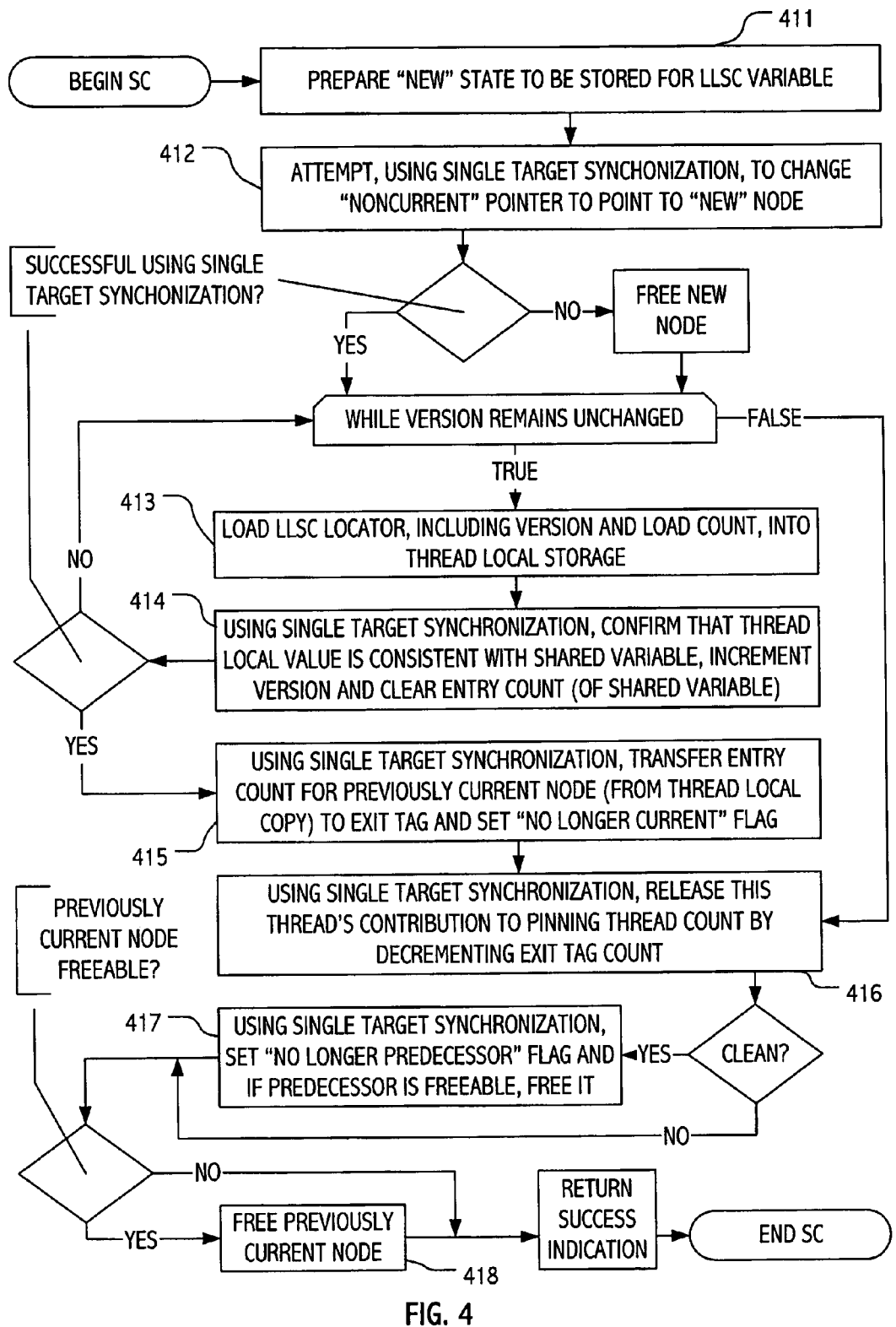
FIG. 4 is a simplified flow diagram for an emulation of a store-conditional (SC) operation in accordance with some embodiments of the present invention.

Referring to FIG. 4, some emulations of an SC operation will be understood based on the following simplified description. We first prepare (411) a new state to be stored for LL/SC variable (such as described above) and attempt (412) using a single-target synchronization such as a compare and swap (CAS) to update the noncurrent pointer to identify the new node. If the single-target synchronization is unsuccessful, we free (419) the new node. However, whether or not successful, as long as the version remains unchanged, we attempt to update the version and thereby cause the noncurrent pointer to become current (and the current pointer noncurrent). In this way, we effect the update (made by this or another thread) by operation of the preceding synchronization (at 412). In particular, we load (413) version and entry count information into thread local storage and, using a single-target synchronization (414), we (i) confirm that the thread local values are consistent those in shared storage and (ii) increment the version and clear the entry count coding of shared storage. We coordinate reclamation as described in greater detail below.

Memory Reclamation

If nodes are never reclaimed, then values stored to ptr0 and ptr1 are all distinct, and it is easy to see the correctness of the algorithm as described. We now explain how our implementation reclaims and reuses nodes and why the algorithm is correct despite this. For clarity of description, we defer consideration of unlink until later in this section; for now, we assume that every LL is matched by an sc.

After an LL successfully executes the CAS at line L5, it reads the contents of the node it determined to be current at lines L6 and S3. We ensure that the node is not reclaimed before this happens. Specifically, after a thread successfully executes the CAS at line L5, we ensure that the node is not reclaimed before that thread invokes release on that node at line S9. Also, to avoid the ABA problem, we ensure that a node is not reclaimed if some thread might still see it as the predecessor of another node (at line S3), and therefore use it as the expected value for the CAS at line S4.

We avoid both premature reclamation scenarios by recording information in entry.count and the exit field of each node that allows us to determine when it is safe to reclaim a node. First, we use entry.count to count the number of threads that successfully execute the CAS at line L5 while entry.ver contains a particular value. Note that entry.count is reset to zero whenever entry.ver is incremented at line S7. When a thread increments entry.count, we say the thread pins the node that is current at that time.

One might think that we could maintain an accurate count of the number of threads that have pinned a node and not subsequently released it by simply decrementing entry.count in release. However, this approach does not work because by the time a thread invokes release for a particular node, that node may no longer be current, so entry.count is being used for a different node—the one that is now current. Therefore, we instead use a node's exit.count field to count the number of threads that have released the node; this counter starts at zero and is decremented by each releasing thread (see lines R4 and R5 of the release pseudocode that follows).

```
Macros:
    CLEAN(exit) ≡ (exit.count == 0 ∧ exit.nlC)
    FREEABLE(exit) ≡ (CLEAN(exit) ∧ exit.nlP)
    void release(Node *nd) {
R1.     Node *pred_nd = nd->pred;
R2.     do {
R3.         ExitTag pre = nd->exit;
R4.         ExitTag post = <pre.count-1,pre.nlC,pre.nlP>;
R5.     } while (!CAS(&nd->exit, pre, post));
R6.     if (CLEAN(post)) setNLPred(pred_nd);
R7.     if (FREEABLE(post)) free(nd);
    }
    void transfer(Node *nd, int count) {
T1.     do {
T2.         ExitTag pre = nd->exit;
T3.         ExitTag post = <pre.count+count,true;pre.nlP>;
T4.     } while (!CAS(&nd->exit, pre, post));
    }
    void setNLPred(Node *pred_nd) {
P1.     do {
P2.         ExitTag pre = pred_nd->exit;
P3.         ExitTag post = <pre.count,pre.nlC,true>;
P4.     } while (!CAS(&pred_nd->exit, pre, post));
P5.     if (FREEABLE(post)) free(pred_nd);
    }
```

We use the transfer procedure to reconcile the number of threads that pinned the node with the number that have since released it. The transfer operation adds the value of entry.count when a node is replaced as the current node to that node's exit.count field (lines S7, S8, and T1 through T4). When exit.count contains zero after this transfer has happened, all threads that pinned this node have since released it.

To distinguish the initial zero state of the exit.count field from the state in which entry.count has been transferred and all threads have executed release, we use a flag nlC in the node's exit field; transfer sets exit.nlC (see line T3) to indicate that the transfer has occurred (nlC stands for "no longer current"; transfer is invoked by the thread that makes the node noncurrent). We say that a node with exit.nlC set and exit.count==0 is clean (as captured by the CLEAN macro).

For the unlink operation, a thread could simply invoke release, as on line U3. However, if entry.ver has not changed since the thread pinned a node, we can instead decrement entry.count (see lines U1 and U2); it is still being used to keep track of the number of threads that pinned the node pinned by the thread that invoked unlink.

In our algorithm as described so far, no thread accesses a clean node. However, it is not always safe to free a clean node: recall that we should also prevent a node from being reclaimed while a thread might still determine it to be the predecessor of another node. For this purpose, we use one more flag in the exit field called nlP (for "no longer predecessor"). At any time, each node is the predecessor of only one node, so we simply need to determine when that node's pred field will no longer be accessed by any thread, that is, when that node is clean. A thread that makes a node clean invokes the setNLPred procedure to set the nlP flag of the node's predecessor (line R6). When a node is clean and has its exit.nlP flag set, as expressed by the FREEABLE macro, it is safe to free the node (lines R7 and P5).

Referring again to FIG. 4, reclamation coordination in some emulations of an SC operation will be understood based on the following simplified description. Using a single-target synchronization, we transfer (415) the entry count information for the previously current node to an exit count and set a no longer current flag. Then, again using a single-target synchronization, we release (416) the current thread's contribution to pinning thread count by decrementing the exit count of the previously current node. If the previously current node is clean (i.e., is no longer pinned and no longer current), we update (417) the exit tag of its predecessor node, again using a single-target synchronization, to indicate that it is no longer a predecessor and, if freeable (i.e., clean and no longer a predecessor of any unclean node), we free the node. Thereafter, if the previously current node is itself freeable, we free (418) that node and return (420) an indication corresponding to the success (or failure) of synchronization 412.

Complexity Analysis

Let us analyze the space requirements for an application using our implementation for LL/SC variables. Each variable requires $O(1)$ space for its LLSCvar structure, and has two nodes that cannot be reclaimed (the nodes pointed to by its ptr0 and ptr1 fields). In addition, each LL/SC sequence in progress can prevent the reclamation of three nodes: the node pinned by the thread between an LL operation and its matching SC or unlink, the predecessor of the pinned node, and the new node used by an SC operation. Thus, in an application with m LL/SC variables, the space used by our algorithm at any time is $O(m+k)$, where k is the number of outstanding LL operations at that time. In the worst case, when all n threads have outstanding LL operations, the space used is $O(m+n)$. Note that this space complexity is asymptotically optimal, and that the space used adapts to the number of threads actually accessing the LL/SC variables at any time. In particular, only $O(m)$ space is needed when no threads are accessing these variables.

As previously reviewed, the only known 64-bit-clean implementation of LL/SC variables (that proposed by Jayanti and Petrovic) requires $O(mn)$ space and further requires a priori knowledge of n. In addition to the structural differences between our mechanisms and those of conventional approaches and the space-adaptivity and scaling attributes of the illustrated design, our techniques are population oblivious in that they do not require a priori knowledge of n.

3.3 Optimizations and Extensions

Our LL/SC implementation can be made more efficient by observing that if FREEABLE(post) holds before the CAS on line R5 or line P4, then the CAS does not need to be executed; mynode can simply be freed because there are no threads that still have to release this node. Similarly, a thread that calls transfer at line S8 will always subsequently call release at line S9. Therefore, we can combine the effect of the two CASes in those two procedures into a single CAS.

It is easy to extend our implementation to allow threads to have multiple outstanding LL operations: each thread simply maintains separate mynode and myver local variables for each outstanding LL. In the resulting extension, a thread may pin several nodes simultaneously (one for each outstanding LL). The space complexity of this extension is still $O(m+k)$, but now there may be more outstanding LL operations than threads (i.e., we may have k>n). In the unlikely case that all n threads simultaneously have outstanding LL operations on all m variables, then $O(mn)$ space is used. However, this much space is used only while $O(mn)$ LL operations are outstanding. As before, if no threads are accessing the LL/SC variables, then the space consumed is $O(m)$.

We can also extend our implementation to provide an operation that "validates" the previous LL, that is, determines whether its future matching SC can still succeed. A validate operation simply determines whether the noncurrent pointer still points to the predecessor of the node stored in mynode by the LL operation. If so, a future SC can replace it with a new node, thereby ensuring its success.

If our techniques are used with a memory allocator that is not lock-free, then neither is our LL/SC implementation. However, lock-free allocators such as those described in D. Dice and A. Garthwaite, *Mostly Lock-free Malloc*, in *Proceedings of the ACM SIGPLAN International Symposium on Memory Management* (2002) or M. Michael, *Scalable Lock-Free Dynamic Memory Allocation*, in *Proceedings of the ACM SIGPLAN 2004 Conference on Programming Language Design and Implementation*, pp. 35-46 (2004) may be employed.

Alternatively, using techniques that build on those described herein, we may achieve a lock-free implementation using a lock-free freelist to manage nodes. Design of such a lock-free freelist is described in detail in co-pending U.S. patent application Ser. No. 11/026,850, filed on even date herewith, entitled "A SPACE-ADAPTIVE LOCK-FREE FREELIST USING POINTER-SIZED SINGLE-TARGET SYNCHRONIZATION" and naming Moir, Doherty, Luchangco and Herlihy as inventors, the entirety of which is incorporated by reference. However, to summarize, the basic technique is to populate the freelist with enough nodes that one is always available for an SC operation to use. The number of nodes needed depends on the number of threads that simultaneously access the implemented variable. If we cannot bound this number in advance, we can resort to the standard memory allocator to increase the size of the freelist upon thread creation, and remove nodes from the freelist and free them upon thread destruction. While this approach involves locking when creating or destroying a thread, we avoid locking during the lifetime of each thread.

Population-Oblivious, Space-Adaptive Queue

We now describe a 64-bit-clean lock-free FIFO queue implementation that is population-oblivious and consumes space proportional only to the number of items in the queue and the number of threads currently accessing the queue. Queues form the basis of many cooperative concurrent computations and, as such, are good data structure for which to demonstrate the use of our techniques. One lock-free queue implementation that is well known in the art is that Michael and Scott. See M. Michael and M. Scott, *Nonblocking Algorithms and Preemption-Safe Locking on Multiprogrammed Shared Memory Multiprocessors*, Journal of Parallel and Distributed Computing, 51(10): 1-26 (1998). For clarity of description and as a guide to the application of our techniques to other shared objects, we therefore use an implementation patterned on that of Michael and Scott. It will be understood that our invention is not limited to any particular shared queue implementation or, indeed, to any particular shared object.

Unfortunately, the conventional Michael and Scott queue implementation uses version numbers and reduced-width Head and Tail pointers to address ABA hazards otherwise inherent in CAS synchronization of full-CAS-width pointer encodings. In short, the implementation is not 64-bit-clean. Furthermore, the conventional implementation cannot free nodes that have been dequeued; instead it stores them in a structure-specific freelist for subsequent reuse, resulting in space consumption proportional to the historical maximum size of the queue. Accordingly, the lock-free queue that we now describe has both structural differences and significant advantages when compared to conventional lock-free queue implementations.

The pseudocode that follows implements enqueue and dequeue operations on a doubly-linked list that encodes a queue.

```
       void enqueue(Value v) {
E1.       Node *nd = alloc(Node);
E2.       nd->v = v;
          nd->next = null;
          nd->exit = INIT_EXIT;
E3.       while (true) {
E4.          Node *tail = LL(&Tail);
E5.          nd->pred = tail;
E6.          if (CAS(&tail->next, null, nd)) {
E7.             SC(&Tail, nd);
E8.             return;
E9.          } else
E10.            SC(&Tail, tail->next);
          }
       }
       Value dequeue( ) {
D1.       while (true) {
D2.          Node *head = LL(&Head);
D3.          Node *next = head->next;
D4.          if (next == null) {
D5.             unlink(&Head);
D6.             return null   ;
          }
D7.          if (SC(&Head, next)) {
D8.             Value v = next->v;
D9.             setToBeFreed(next);
D10.            return v;
          }
       }
    }
```

Rather than modifying Head and Tail pointers with CAS and using version numbers to avoid the ABA problem, we use LL and SC operations. If we ignore memory management issues for a moment, and assume that the LL and SC operations used are hardware-supported ones, then this implementation corresponds to a CAS to LL/SC transformation of the conventional implementation. However, to facilitate the memory management and achieve a 64-bit-clean space-adaptive implementation, we use LL and SC operations similar to those presented in the previous section in place of the standard operations. As before, the employed LL and SC operations are themselves based upon CAS operations or other suitable single-target synchronization including hardware LL/SC operations whose limitations make unmediated use of the hardware synchronization unattractive or impractical.

The LL and SC operations used here differ from those in the previous section in several ways. First, because in the queue implementation illustrated, the values stored in Head and Tail are just pointers, the additional level of indirection used (in the previous section) to support variables of arbitrary size is unnecessary. Accordingly, we deal with node pointers directly. Thus, we embed the exit and pred fields in the queue node structure, as shown below.

```
       typedef struct {
          Value v;
          Node *next;
          Node *pred;
          ExitTag exit;
       } Node;
       typedef struct {
          int Count;
          int transfersLeft;
          bool nlP;
          bool toBeFreed;
       } ExitTag;
```

Second, the SC operation does not allocate and initialize a new node, but rather uses the node passed to it by enqueue or dequeue. Nodes are allocated and initialized by enqueue. Third, we modify ExitTag to support node reclamation appropriate for the queue. In our queue implementation, a node should not be reclaimed until it has been replaced as the Tail node and it has been replaced as the Head node. Each of the SC operations that effect these changes should therefore transfer a count of pinning threads to the node.

The following modified LL and SC operations include the appropriate modifications.

```
        Node *LL(LLSCvar *loc) {
L1.        do {
L2.            EntryTag e = loc->entry;
L3.            myver = e.version;
L4.            mynode = CURRENT(loc,e.ver);
L5.        } while (!CAS(&loc->entry,e,<e.ver,e.count+1>));
L6.        return mynode;
        }
```

To understand node reclamation and, in particular, our technique for ensuring that a node is not reclaimed until it has been replaced as the Tail node and it has been replaced as the Head node, we turn to pseudocode for modified release, transfer and setNLPred procedures and a new setToBeFreed procedure. The SC operations that effect these replacements should therefore transfer a count of pinning threads to the node.

```
        INIT_EXIT = {0, 2, false, false}
        CLEAN(exit) = (exit.count == 0 ^ exit.transfersLeft == 0)
        FREEABLE(exit) = (CLEAN(exit) ^ exit.nlP ^ exit.toBeFreed)
            void release(Node *nd) {
R1.            Node *pred_nd = nd->pred;
R2.            do {
R3.                ExitTag pre = nd->exit;
R4.                ExitTag post = <pre.count-1, pre.transfersLeft,
                                    pre.nlP, pre.toBeFreed>;
R5.            } while (!CAS(&nd->exit, pre, post));
R6.            if (CLEAN(post)) setNLPred(pred_nd);
R7.            if (FREEABLE(post)) free(nd);
        }
            void transfer(Node *nd, int count) {
T1.            do {
T2.                ExitTag pre = nd->exit;
T3.                ExitTag post = <pre.count+count,
                                    pre.transfersLeft-1,
                                    pre.nlP, pre.toBeFreed>;
T4.            } while (!CAS(&nd->exit, pre, post));
        }
            void setNLPred(Node *pred_nd) {
P1.            do {
P2.                ExitTag pre = pred_nd->exit;
P3.                ExitTag post = <pre.count, pre.transfersLeft,
                                    true, pre.toBeFreed>;
P4.            } while (!CAS(&pred_nd->exit, pre, post));
P5.            if (FREEABLE(post)) free(pred_nd);
        }
            void setToBeFreed(Node *pred_nd) {
F1.            do {
F2.                ExitTag pre = pred_nd->exit;
F3.                ExitTag post = <pre.count, pre.transfersLeft,
                                    pre.nlP, true>;
F4.            } while (!CAS(&pred_nd->exit, pre, post));
F5.            if (FREEABLE(post)) free(pred_nd);
        }
```

To detect when a given node has been replaced as both the Head node and the Tail node (and that each of the relevant counts of pinning threads have been transferred to the node), we replace the boolean flag nlC of the ExitTag structure in the previous section with a counter transfersLeft. This counter is initialized to 2 and decremented by each transfer: when the counter is zero, both transfers have occurred. The CLEAN macro is also modified to check whether transfersLeft is zero rather than whether nlC is set.

Finally, as before, we use the exit.nlP field to avoid the ABA problem when changing the noncurrent pointer to point to a new node on line S4. However, observe that line D8 reads a value from a node that may not be pinned by any LL operation. We also want to ensure that this node is not reclaimed before this read occurs. Because only one thread (the one that changes Head to point to this node) reads this value, a single additional flag toBeFreed suffices. We set the toBeFreed flag by invoking setToBeFreed (at line D9). The FREEABLE macro has been appropriately modified to check state of the toBeFreed flag.

As with the LL/SC implementation in the previous section, we can avoid the overhead of a general-purpose allocator by using a freelist to store dequeued nodes for future reuse. If we know a bound on the maximum size of the queue, we can populate the freelist in advance and avoid using the general-purpose allocator at all. Otherwise, enough enqueue operations will inevitably require us to allocate new nodes.

Figure 5:
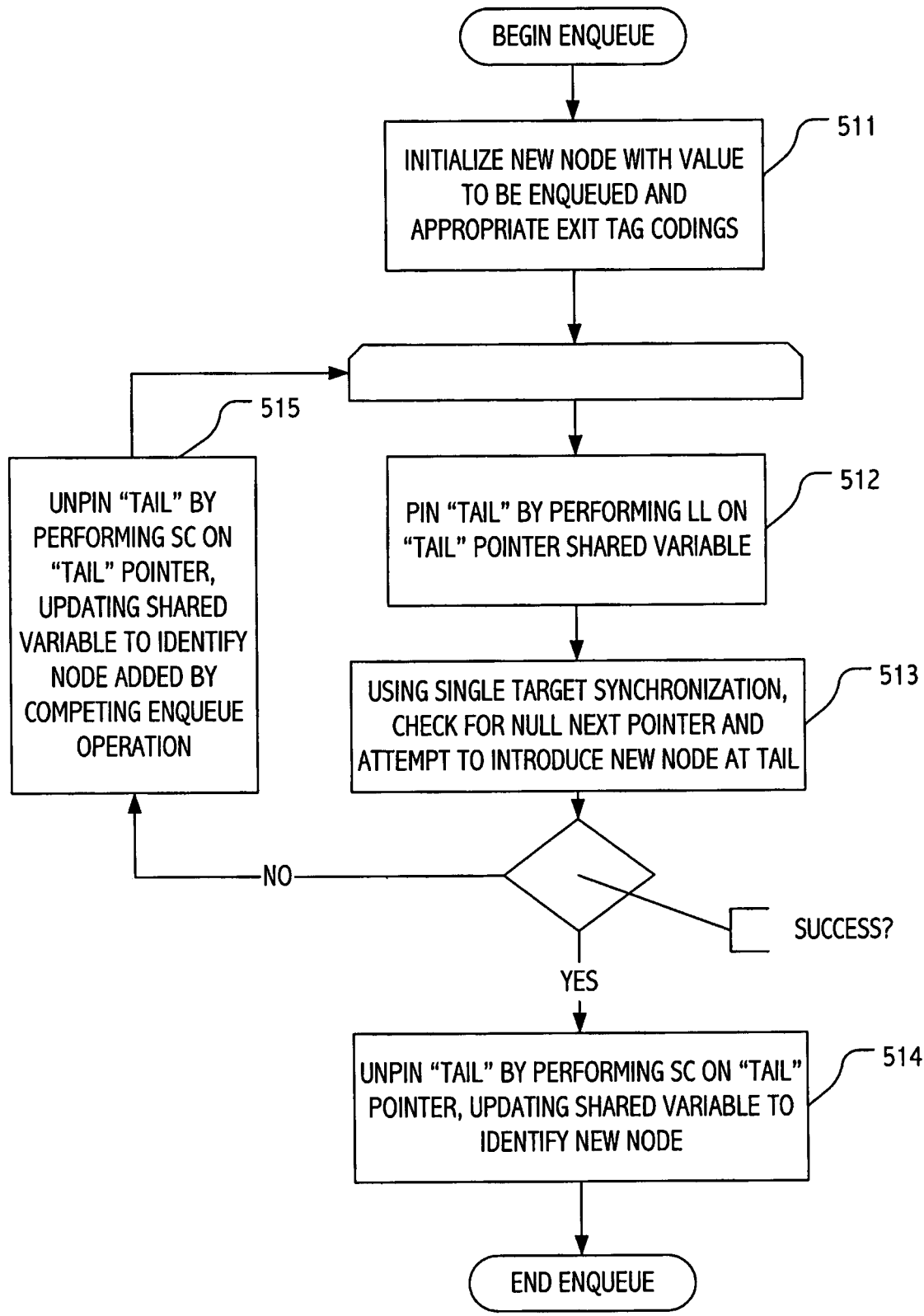
FIG. 5 is a simplified flow diagram for enqueue sequence on a lock-free queue implementation in accordance with some embodiments of the present invention.

Referring to FIG. 5, some implementations of an enqueue operation will be understood based on the following simplified description. First, we initialize (511) a new node encoding the value to be enqueued and an appropriate initial encoding (such as described above) for exit tag. Next, we pin (512) state of the shared variable Tail by employing an LL operation thereon. Details of suitable LL operation implementations will be understood based on the preceding descriptions. Of course, while encapsulation of appropriate functionality in an LL operation sequence provides a useful descriptive context, other implementations may eliminate or redefine functional boundaries while performing substantially similar sequences of synchronization operations and entry tag manipulations. Using a single-target synchronization (513) such as a CAS, we confirm that the apparent tail node does not have a next node (i.e., that tail->next == null) and, if so, update the appropriate next pointer to introduce the new node.

On success, we unpin (514) state of the shared variable Tail by employing an SC operation thereon to update Tail to identify the newly enqueued node. As before, details of suitable SC operation implementations will be understood based on the preceding descriptions. Of course, while encapsulation of appropriate functionality in an SC operation sequence provides a useful descriptive context, other implementations may eliminate or redefine functional boundaries while performing substantially similar sequences of synchronization operations, version updates, transfers of pinning thread counts, etc.

On failure of the single-target synchronization (at 513), we unpin (515) state of the shared variable Tail by employing an SC operation thereon and retry. By performing the SC operation (at 515), we may "help" a concurrent enqueue operation. In particular, if we failed to add the new node, it is because a concurrent enqueue operation added its new node, and this SC attempts to update Tail so that it points to that operation's new node. If the SC fails, it is because another thread (perhaps the one that added its new node) has already updated Tail accordingly, so we can just retry.

We then retry the pin-update-unpin sequence, pinning (at 512) state of the shared variable Tail and continuing as previously described.

Figure 6:
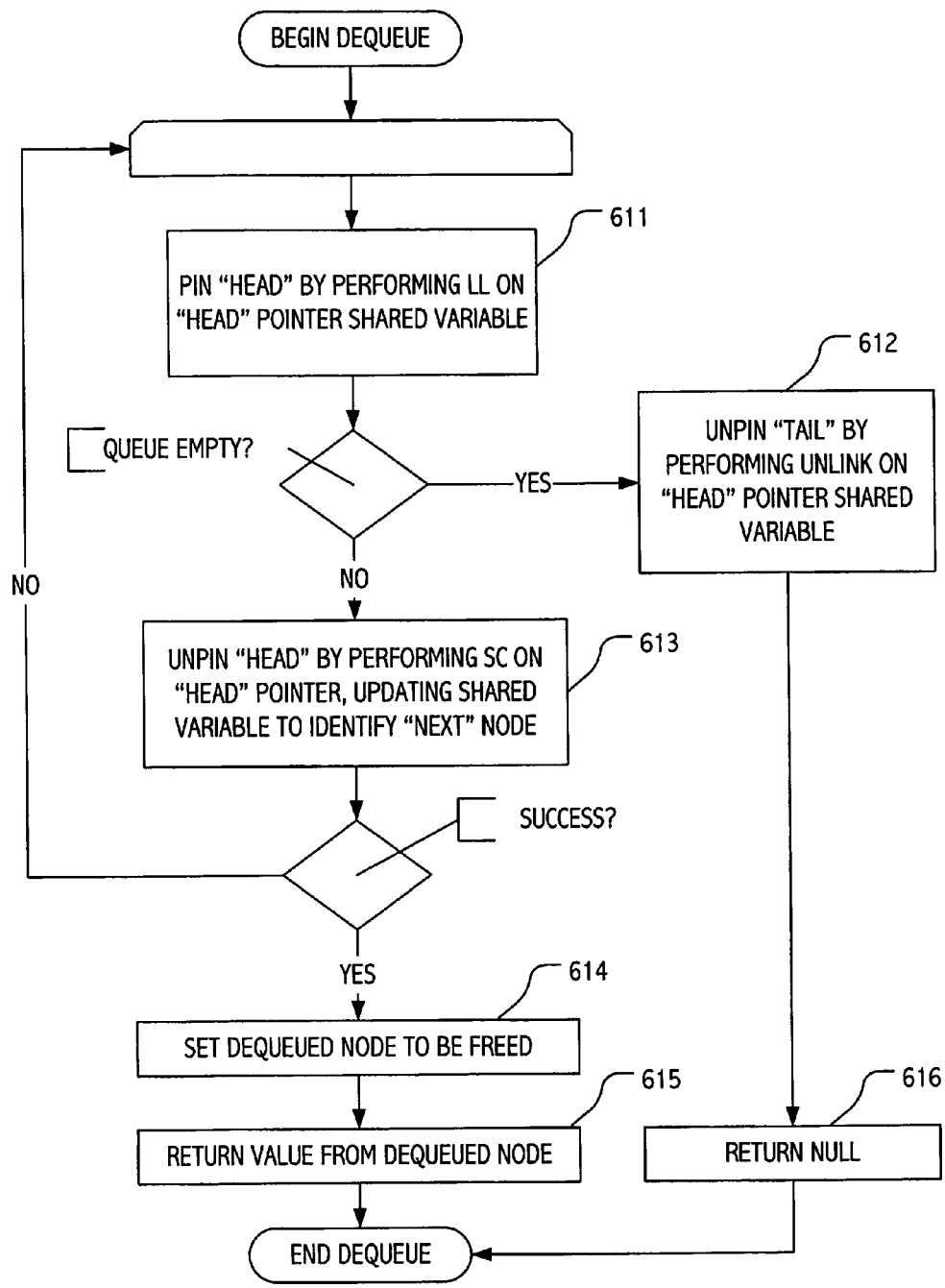
FIG. 6 is a simplified flow diagram for dequeue sequence on a lock-free queue implementation in accordance with some embodiments of the present invention.

Turning to FIG. 6, some implementations of a dequeue operation will be understood based on the following simplified description. First, we pin (611) state of the shared variable Head by employing an LL operation thereon. Next, we check for an empty queue condition and, if indicated, we unpin (612) state of the shared variable Head using an unlink operation and return (616) null. If, the queue does not appear to be empty, we attempt (613) to update shared variable Head to identify the next node using an SC operation to unpin state of the shared variable Head. If successful, we set (614) the dequeued node to be freed by appropriately updating exit tag codings (as previously described) and return (615) the value obtained from the dequeued node.

As with the enqueue illustration, details of suitable LL and SC operation implementations will be understood based on the preceding descriptions and, while encapsulation of appropriate functionality in an LL and/or SC operation sequences provides a useful descriptive context, other implementations may eliminate or redefine functional boundaries while performing substantially similar sequences of synchronization operations, version updates, transfers of pinning thread counts, entry or exit tag manipulations, etc.

Other Embodiments

While the invention(s) is(are) described with reference to various implementations and exploitations, it will be understood that these embodiments are illustrative and that the scope of the invention(s) is not limited to them. Terms such as always, never, all, none, etc. are used herein to describe sets of consistent states presented by a given computational system, particularly in the context of correctness proofs. Of course, persons of ordinary skill in the art will recognize that certain transitory states may and do exist in physical implementations even if not presented by the computational system. Accordingly, such terms and invariants will be understood in the context of consistent states presented by a given computational system rather than as a requirement for precisely simultaneous effect of multiple state changes. This "hiding" of internal states is commonly referred to by calling the composite operation "atomic", and by allusion to a prohibition against any process seeing any of the internal states partially performed. Operations that "coincide" typically need not occur simultaneously, but rather through a sequence of operations that may appear to be atomic.

Many variations, modifications, additions, and improvements are possible. For example, while application to particular concurrent shared objects and particular implementations thereof have been described in detail herein, applications to other shared objects and other implementations will also be appreciated by persons of ordinary skill in the art. For example, while techniques and mechanisms have been described using CAS operations as an exemplary single-target synchronization, persons of ordinary skill in the art will recognize that it is straightforward to modify such implementations for use in architectures that support LL/SC instead of CAS. See generally, M. Moir, *Practical Implementations of Nonblocking Synchronization Primitives*, in *Proceedings of the 16th Annual ACM Symposium on Principles of Distributed Computing*, pages 219-228 (1997) for a review of the appropriate transformations.

Similarly, though odd/even version codings (e.g., entry.ver) have been used to differentiate between current and noncurrent nodes and incrementing operations have been utilized to advance state, other codings and operations may be employed in other implementations. In addition, while comparatively simple data structure codings have been used to simplify description of our techniques, more complex shared object structures may be defined, which exploit the techniques described herein.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A computing system, comprising:
   one or more processors configured for multithreaded operation;
   a memory comprising program instructions executable by the one or more processors to implement:
   a lock-free shared queue; and
   coordination of accesses to the queue that employs only pointer-sized single-target synchronizations; and
   wherein the program instructions further comprise a functional sequence executable to select, using a first one of the pointer-sized single-target synchronizations, a previously unselected one of two alternative end node identifying pointers, the two alternative pointers identifying different respective nodes as the end node of one end of the shared queue.

2. The computing system of claim 1, wherein the functional sequence is further executable to, upon successful completion of the first pointer-sized single-target synchronization, transfer a pinning thread count to a node of the queue previously identified by the previously selected end node identifying pointer.

3. The computing system of claim 1,
   wherein the end node is a tail node of the queue; and
   wherein the functional sequence includes an enqueue sequence executable to introduce a new node at the tail node end of the queue.

4. The computing system of claim 1,
   wherein the end node is a head node of the queue; and
   wherein the functional sequence includes an dequeue sequence executable to remove a node from the head node end of the queue.

5. The computing system of claim 2,
   wherein the program instructions are further executable to implement, in said transferring the pinning thread count, clearing an encoding of end node pinning thread count by operation of the first pointer-sized single-target synchronization.

6. The computing system of claim 5,
   wherein the end node pinning thread count and an alternating pointer selector are encoded together in a target of the first pointer-sized single-target synchronization.

7. The computing system of claim 5,
   wherein the program instructions are further executable to implement, in said transferring the pinning thread count, introducing the end node pinning thread count into a node associated pin count by operation of a second pointer-sized single-target synchronization.

8. The computing system of claim 1, wherein the program instructions are further executable to implement:
   an entry tag coding selective for identifying a current one of the two alternative end node identifying pointers and including a pinning thread count, the entry tag coding alternating between selecting the current one and a non-current one of the two alternative end node identifying pointers by operation of a particular one of the pointer-sized single-target synchronizations.

9. The computing system of claim 8,
wherein the end node is a tail node of the queue, and
wherein the particular pointer-sized single-target synchronization enqueues a new node at the tail node end of the queue.

10. The computing system of claim 8,
wherein the end node is a head node of the queue, and
wherein the particular pointer-sized single-target synchronization dequeues a node from the head node end of the queue.

11. The computing system of claim 1, wherein the program instructions are further executable to implement:
a mechanism for tracking unreleased pinning thread counts.

12. The computing system of claim 11,
wherein the tracking mechanism employs instances of the pointer-sized single-target synchronizations for coordinating transfer of pinning thread counts accumulated while a given node resides at an end node position of the queue.

13. The computing system of claim 1, wherein the program instructions are further executable to implement:
an exit tag coding associable with a node that has at some time resided in the queue, the exit tag coding including a net unreleased pinning thread count and tracking transfer to the exit tag coding of pinning thread counts accumulated while the node resides at an end node position of the queue.

14. The computing system of claim 13,
wherein the node is reclaimable if all pinning thread counts have been transferred to the exit tag coding and a net unreleased pinning thread count indicates that no threads, other than a reclaiming thread maintain a pointer to the node.

15. The computing system of claim 1,
wherein the pointer-sized single-target synchronizations include pointer-sized compare-and-swap (CAS) operations.

16. The computing system of claim 1,
wherein the pointer-sized single-target synchronizations include pointer-sized load-linked (LL) and store-conditional (SC) operation pairs.

17. The computing system of claim 1,
wherein the pointer-sized single-target synchronizations include certain pointer-sized single-target synchronizations employed in an emulation of load-linked, store-conditional (LL/SC) synchronization.

18. A computer-readable storage medium, comprising program instructions computer-executable to implement:
a shared queue accessible by a plurality of threads executing on one or more processors;
an entry tag selective for one of two alternative tail pointers, a first instance of the entry tag instantiable to select a current one of the two alternative tail pointers; and
an ENQUEUE sequence executable to introduce into a non-current one of the two alternative tail pointers, a pointer to an enqueued node, the non-current one of the two alternative tail pointers thereafter selectable as a current one of the two alternative tail pointers by operation of a first single-target synchronization on the first entry tag.

19. The storage medium of claim 18, wherein the program instructions are further executable to implement:
a second instance of the entry tag instantiable to select a current one of two alternative head pointers; and
a DEQUEUE sequence executable to introduce into a non-current one of the two alternative head pointers, a pointer to a node that is next in queue after a to-be-dequeued node, the non-current one of the two alternative head pointers thereafter selectable as a current one of the two alternative head pointers by operation of a second single-target synchronization on the second entry tag.

20. The storage medium of claim 18,
wherein the first single-target synchronization includes a compare-and-swap (CAS) operation targeting the first entry tag.

21. The storage medium of claim 18,
wherein the first single-target synchronization includes a load-linked, store-conditional (LL/SC) operation sequence targeting the first entry tag.

22. The storage medium of claim 18,
wherein the ENQUEUE sequence employs an emulation of load-linked, store-conditional (LL/SC) synchronization, and
wherein the first single-target synchronization is performed as part of the emulation of the store-conditional.

23. The storage medium of claim 18, wherein the program instructions are further executable to implement:
one or more exit tags, the exit tags instantiable in association with respective nodes of the queue and structured to encode information indicative of reclaimable status of the associated respective node.

24. The storage medium of claim 23, wherein the program instructions are further executable to implement:
a definition of the node encoding, and
wherein the node encoding includes the associated exit tag.

25. The storage medium of claim 23,
wherein the information indicative of reclaimable status includes information for tracking pinning threads and corresponding releases for the associated respective node.

26. The storage medium of claim 23,
wherein the information indicative of reclaimable status includes information for tracking successful completions of the ENQUEUE sequence and of a DEQUEUE sequence operating on the associated respective node.

27. The storage medium of claim 23,
wherein the first entry tag includes a pinning thread count portion updated by operation of a third single-target synchronization of the ENQUEUE sequence in correspondence with successful loads of the tail pointer, and
wherein the information indicative of reclaimable status includes information for tracking successful transfer of the pinning thread count to the exit tag associated with the respective node.

28. The storage medium of claim 23,
wherein the information indicative of a reclaimable status includes an accounting of pinning load operations that successfully loaded a pointer to the associated respective node and that remain unreleased.

29. The storage medium of claim 18,
wherein the entry tags are further structured to encode information indicative of a count of threads that have pinned state of a current one the respective alternative pointers; and
wherein the ENQUEUE sequence is further executable to transfer, coincident with the alternative pointer selection, the pinning thread count.

30. The storage medium of claim 29,
wherein the program instructions are further executable to implement, in said transfer of pinning thread count, operation of a single-target synchronization on an exit tag associated with the enqueued node.

31. The storage medium of claim 29,
wherein the ENQUEUE sequence is further executable to decrement the pinning thread count coincident with completion thereof.

32. The storage medium of claim 18,
wherein either or both of the first and second entry tag instances include both a version portion selective for a particular one of the two alternative pointers and a count portion indicative of a currently outstanding number of successful loads operations that target the associated respective tail or head pointer.

33. The storage medium of claim 18,
wherein the shared queue is instantiated in memory of a multiprocessor; or embodied, at least in part, in an execution environment or operating system.

34. A computer-readable storage medium, comprising program instructions computer-executable to implement:
a shared queue accessible by a plurality of threads executing on one or more processors;
an entry tag selective for one of two alternative head pointers, a first instance of the entry tag instantiable to select a current one of the two alternative head pointers; and
a DEQUEUE sequence executable to introduce into a non-current one of the two alternative head pointers, a pointer to a node that is next in queue after a to-be-removed node, the non-current one of the two alternative head pointers thereafter selectable as a current one of the two alternative head pointers by operation of a first single-target synchronization on the first entry tag.

35. A computer-readable storage medium comprising program instructions computer-executable to implement:
a lock-free software implementation of a shared queue;
a first functional sequence implementing an ENQUEUE operation;
a second functional sequence implementing a DEQUEUE operation;
wherein the ENQUEUE and DEQUEUE operations are concurrently executable, without use of a synchronization primitive that atomically manipulates storage larger than a pointer, to add to and remove nodes from a dynamically-sizable data structure that encodes the queue;
wherein at least one of the ENQUEUE and DEQUEUE operations employs a pointer-sized single-target synchronization primitive to select one of two alternative end node identifying pointers, the two alternative pointers identifying different respective nodes as the end node of one end of the shared queue; and
wherein the DEQUEUE operation supports reclamation of a node removed from the queue and wherein space consumption is adaptive to both queue size and number of threads that concurrently access the queue.

36. The storage medium of claim 35,
wherein the ENQUEUE operation is executable to select, using a first pointer-sized single-target synchronization, a previously unselected one of two alternative tail node identifying pointers and to, upon successful completion thereof, transfer a pinning thread count to a node of the queue previously identified by the previously selected tail node identifying pointer.

37. The storage medium of claim 35,
wherein the DEQUEUE operation is executable to select, using a second pointer-sized single-target synchronization, a previously unselected one of two alternative head node identifying pointers and to, upon
successful completion thereof, transfer a pinning thread count to a node of the queue previously identified by the previously selected head node identifying pointer.

38. The storage medium of claim 35, wherein the program instructions are further executable to implement:
an entry tag coding selective for identifying a current one of two alternative pointers to an end node at one end of the queue and including a pinning thread count, the selection of the entry tag coding updatable from the current one to a non-current one of the two alternative end node identifying pointers by operation of a pointer-sized single-target synchronization.

39. The storage medium of claim 35, wherein the program instructions are further executable to implement:
an exit tag coding associable with a node that has at some time resided in the queue, the exit tag coding including a net unreleased pinning thread count and tracking transfer to the exit tag coding of pinning thread counts accumulated while the node resides at an end node position of the queue.

40. The storage medium of claim 35,
wherein the ENQUEUE and DEQUEUE operations employ pointer-sized single-target synchronization primitives to manipulate alternative tail node identifying pointers and alternative head node identifying pointers, respectively.

41. The storage medium of claim 40, wherein the pointer-sized single-target synchronization primitives include one or more of:
pointer-sized Compare-and-Swap (CAS) operations;
pointer-sized load-linked (LL) and store-conditional (SC) operation pairs; and
an emulation of load-linked, store-conditional (LL/SC) synchronization.

42. A method of operating a computational system, the method comprising:
instantiating a data structure representation of a queue in shared memory, the queue including a head end identifying construct and a tail end identifying construct, wherein at least one of the head end and tail end identifying constructs is shared and has an associated entry tag selective for a respective one of two alternative pointers thereof, the two alternative pointers identifying different nodes as the end node; and
performing an access operation at one of the head end and the tail end of the queue, the access operation including alternating, by operation of a first pointer-sized single-target synchronization, a selection of the respective one of two alternative pointers; and
in response to successful completion of the first pointer-sized single-target synchronization, transferring a count of threads that have loaded, and not released, a private copy of the previously selected alternative pointer.

43. The method of claim 42, further comprising:
reclaiming a node dequeued from the queue based, at least in part, on an accounting of the transferred thread count.

44. The method of claim 42,
wherein the thread count is transferred to a node previously identified by previously selected alternative pointer.

45. The method of claim 42,
wherein both head end and tail end identifying constructs are shared.

46. The method of claim 42,
wherein the access operation is an enqueue operation performed at the tail end of the queue.

47. The method of claim 46, further comprising:
performing a dequeue operation at the head end of the queue, the dequeue operation including alternating, by operation of a second pointer-sized single-target synchronization, a selection of head end alternative pointers; and in response to successful completion of the second pointer-sized single-target synchronization, transferring a count of threads that have loaded, and not released, a private copy of the previously selected head end pointer.

48. The method of claim 47,
wherein the thread count is transferred to an exit tag associated with a node dequeued, by the successful completion of the second pointer-sized single-target synchronization, from the head end of the queue.

49. The method of claim 42,
wherein the access operation is a dequeue operation performed at the head end of the queue.

50. The method of claim 46, further comprising:
performing an enqueue operation at the tail end of the queue, the enqueue operation including alternating, by operation of a third pointer-sized single-target synchronization, a selection of tail end alternative pointers; and in response to successful completion of the third pointer-sized single-target synchronization, transferring a count of threads that have loaded, and not released, a private copy of the previously selected tail end pointer.

51. The method of claim 50,
wherein the thread count is transferred to an exit tag associated with a node residing, prior to the successful completion of the third pointer-sized single-target synchronization, at the tail end of the queue.

52. A computing system, comprising:
one or more processors;
a memory shared amongst the one or more processors to allow concurrent access to a queue instantiated therein by threads executable on respective ones of the processors;
wherein the memory further comprises program instructions executable by the one or more processors to implement a lock-free synchronization construct comprising:

an entry tag coding selective for identifying a current one of two alternative pointers to an end node at one end of the queue and an associated pinning thread count, the entry tag coding configured to alternate between selecting the current one and a non-current one of the two alternative end node identifying pointers; and a functional sequence executable to alternate, by operation of a pointer-sized single-target synchronization, a selection of one of the two alternative end node identifying pointers and to, upon successful completion of the pointer-sized single-target synchronization, transfer a pinning thread count to a node of the queue previously identified by the previously selected one of the two alternative end node identifying pointer.

53. The computing system of claim 52,
wherein the end node is a tail node of the queue and the functional sequence includes an enqueue sequence;
wherein the program instructions are further executable by the one or more processors to implement a second lock-free synchronization construct including:

a second entry tag coding selective for identifying a current one of two alternative pointers to a head node of the queue and an associated pinning thread count, the second entry tag coding alternating between selecting the current one and a non-current one of the alternative head node identifying pointers; and a dequeue sequence executable to alternate, by operation of a pointer-sized single-target synchronization, a selection of one of the two alternative head node identifying pointers; and to, in response to successful completion of the pointer-sized single-target synchronization, transfer a pinning thread count to a node of the queue previously identified by the previously selected one of the two alternative head node identifying pointers.

54. The computing system of claim 52, wherein the program instructions are further executable by the one or more processors to implement:
an exit tag coding associable with the transferred to node, the exit tag coding including a net unreleased pinning thread count and tracking transfer to the exit tag coding of pinning thread counts accumulated while the node resides at an end node position of the queue.

* * * * *

UNITED STATES PATENT AND TRADEMARK OFFICE
CERTIFICATE OF CORRECTION

PATENT NO. : 7,577,798 B1  Page 1 of 1
APPLICATION NO. : 11/026255
DATED : August 18, 2009
INVENTOR(S) : Moir et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 542 days.

Signed and Sealed this

Seventh Day of September, 2010

David J. Kappos
*Director of the United States Patent and Trademark Office*